United States Patent
Guillemette et al.

(10) Patent No.: US 9,656,437 B2
(45) Date of Patent: May 23, 2017

(54) EXTRUDABLE ORIENTED POLYMER COMPOSITES

(71) Applicant: Guill Tool & Engineering Co. Inc., West Warwick, RI (US)

(72) Inventors: Richard Guillemette, West Warwick, RI (US); Robert Peters, West Warwick, RI (US); Christopher Hummel, West Warwick, RI (US)

(73) Assignee: Guill Tool & Engineering Co., Inc., West Warwick, RI (US)

( * ) Notice: Subject to any disclaimer, the term of this patent is extended or adjusted under 35 U.S.C. 154(b) by 87 days.

(21) Appl. No.: 14/185,629

(22) Filed: Feb. 20, 2014

(65) Prior Publication Data

US 2014/0242310 A1    Aug. 28, 2014

Related U.S. Application Data

(60) Provisional application No. 61/767,232, filed on Feb. 20, 2013.

(51) Int. Cl.
| | |
|---|---|
| *B32B 1/08* | (2006.01) |
| *B29C 47/06* | (2006.01) |
| *B29C 47/10* | (2006.01) |
| *B32B 27/08* | (2006.01) |
| *B32B 27/20* | (2006.01) |

(Continued)

(52) U.S. Cl.
CPC .............. *B32B 1/08* (2013.01); *B29C 47/061* (2013.01); *B29C 47/062* (2013.01); *B29C 47/065* (2013.01); *B29C 47/1045* (2013.01); *B32B 27/08* (2013.01); *B32B 27/20* (2013.01); *B29C 47/003* (2013.01); *B29C 47/0023* (2013.01); *B29C 47/0033* (2013.01); *B29K 2001/00* (2013.01); *B29L 2009/00* (2013.01); *B29L 2023/00* (2013.01); *B29L 2031/001* (2013.01); *B32B 2262/0269* (2013.01); *B32B 2262/067* (2013.01); *B32B 2262/101* (2013.01); *B32B 2262/106* (2013.01); *B32B 2264/067* (2013.01); *B32B 2307/51* (2013.01); *B32B 2307/54* (2013.01); *B32B 2597/00* (2013.01); *Y10T 428/1348* (2015.01); *Y10T 428/1372* (2015.01)

(58) Field of Classification Search
CPC ....... B32B 1/08; B29C 47/061; B29C 47/062; B29C 47/065; B29C 47/1045; B29C 47/0023; B29C 47/003; B29C 47/0033; B29K 2001/00; B29L 2009/00; B29L 2023/00; B29L 2031/001; Y10T 428/1348; Y10T 428/1372
See application file for complete search history.

(56) References Cited

U.S. PATENT DOCUMENTS 3,576,707 A * 4/1971 Schrenk et al. .... B29C 47/0026
264/171.13
2008/0254281 A1* 10/2008 Chen et al. ................... 428/335

FOREIGN PATENT DOCUMENTS

CN    1687626    * 10/2005

* cited by examiner

*Primary Examiner* — Michael C Miggins
(74) *Attorney, Agent, or Firm* — Ziegler IP Law Group, LLC (57) ABSTRACT

A novel tubular or profile shapes of co-extruded multilayer polymers. These materials contain tens to thousands of layers of milli-, micro- to nano- polymer layers. These new shapes contain contiguous layers of milli- to nano- polymer layers in three dimensions and these contiguous layers may be twisted or turned to further expand the potential microlayer geometries.

5 Claims, 10 Drawing Sheets

Orientation with layers (51) Int. Cl.
*B29K 1/00* (2006.01)
*B29L 9/00* (2006.01)
*B29L 23/00* (2006.01)
*B29L 31/00* (2006.01)
*B29C 47/00* (2006.01)

Examples of Tubular Polygonal Microlayer Geometries:

Figure 2. Orientation with layers

Figure 3: Less orientation without layers

Figure 4

Figure 5. An extruded product may contain a hollow core.

EXTRUDABLE ORIENTED POLYMER COMPOSITES

FIELD

The present disclosure generally relates to extrusion die systems. In particular, the present disclosure relates to the cyclical extrusion of materials to generate small sized grain features, generally in the range of micro and nanosized grain features, in a tubular or profile shape.

BACKGROUND

Nanostructured materials are generally regarded as materials having very small grain feature size, typically in the range of approximately 1-100 nanometers ($10^{-9}$ meters). Metals, ceramics, polymeric and composite materials may be processed in a variety of ways to form nanosized features. These materials have the potential for wide ranging applications, including for example, industrial, biomedical, 3D printing and electronic applications. As a result, a great deal of study is ongoing to gain a better understanding of the characteristics of these materials.

Conventional extrusion formed products are limited to approximately twelve layers. Micro-layer extrusion processes can extend these limitations. Micro-layer extrusion processes that provide methods for obtaining small grain features is described in U.S. Pat. No. 7,690,908, (hereinafter the "'908 Patent") and U.S. Patent Publication 2012/0189789 (hereinafter the "789 Publication") both of which are commonly owned by the assignee of the instant application, the disclosures of which are incorporated herein by reference in their entirety. Further examples of extrusion technology are described in U.S. Pat. Nos. 6,669,458, 6,533,565 and 6,945,764, also commonly owned by the assignee of the instant application.

The typical micro-layer product is formed in a sheet. If a tubular product is desired, the microlayer is first formed into a sheet and then made into the tube. This creates a weld line or separation between the microlayers. The '908 Patent describes a cyclical extrusion of materials by dividing, overlapping and laminating layers of flowing material, multiplying the flow and further dividing, overlapping and laminating the material flow to generate small grain features and improve properties of the formed product. Examples of the improved properties include, but are not limited to burst strength, tensile strength, tear resistance, barrier and optical properties. The '789 Publication describes extruding a flow of extrusion material in a non-rotating extrusion assembly, forming a first set of multiple laminated flow streams from the extruded flow, amplifying a number of the laminations by repeatedly compressing, dividing and overlapping the multiple laminated flow streams, rejoining the parallel amplified laminated flows, forming a first combined laminate output with nano-sized features from the rejoining; and forming a tubular shaped micro-layer product from the combined laminate output. Such products do not contain a so-called weld line.

BRIEF DESCRIPTION OF THE DISCLOSED EMBODIMENTS

As described herein, the exemplary embodiments overcome one or more of the above or other disadvantages known in the art.

The aspects of the present disclosure are directed to novel tubular or profile shapes of co-extruded multilayer polymers. These materials contain tens to thousands of layers of micro- to nano-polymer layers. These new shapes contain contiguous layers of milli- to nano-polymer layers in three dimensions and these contiguous layers may be twisted or turned to further expand the potential microlayer geometries.

Examples of Tubular Polygonal and Annular geometries are presented in FIGS. 1a-d and are depicted with a limited number of layers for illustrative purposes. Microlayer coextrusion can be used to create products possessing ten to thousands of layers. The layers can contain the same or different polymer and contain different fillers, particles or chemicals. An example with two compositions of the layers could contain composition A and composition B and the layers could alternate A-B-A-B-A-B. or even A-B-B-A-B-B-A-B-B. Three component compositions containing compositions A, B and C may likewise form alternating layers such as A-B-C-A-B-C-A-B-C. Such microlayer extrusions can form their own products or can be applied onto a core. Inner and outer layers can also be extruded with these layers. These products can be hollow or rod like with varying profiles.

Other alignment embodiments include diamond, rombus, pentagon, and hexagon.

Alignment embodiments also include twisted shapes such as spirals.

Another embodiment relates to products containing a hollow inner core with composite milli, micro, or nano layers extruded on the exterior.

Another embodiment relates to products containing a composite inner core extruded with composite milli, micro, or nano layers on the exterior.

Another embodiment relates to I-beam products.

Another embodiment relates to products containing multiple layers of varying components.

Another embodiment relates to products containing filler particles or fibers. More preferred products contain filler particles or fibers aligned along the extrusion axis.

Microlayer coextrusion allows for enhanced alignment of filler particles or fibers along the direction of the extrusion. Filler particles are mostly restrained within each layer and as they approach a magnitude of size similar to the fiber or particle size, shear stresses align particles in the direction of the extrusion. In a particle with three characteristic dimensions, the smallest dimension will be perpendicular to the layer boundary and the longest dimension will be in the direction of the extrusion.

Fillers also refers to flakes such as copper or tin flakes.

Fibers include single fibers or a myriad of other arrangements. Some exemplary arrangements include yarns, a tow of fibers or yarns, a weave, a non-woven, chopped fiber, a chopped fiber mat (with random or ordered formats), or combinations of these formats. The chopped fiber mat or nonwoven may be stretched, stressed, or oriented to provide some alignment of the fibers within the nonwoven or chopped fiber mat, rather than having a random arrangement of fibers.

Fibers also generally possess an average aspect ratio of 10-3000 and more commonly are fibers having an average aspect ratio of 20-1000. Aspect ratios of 20-350 and 50-200 are specifically envisioned. Various types of organic and inorganic fibers are suitable either in monofilament or stranded form (including bundles of fibers bonded together to make a single element which serves as a single fiber in the sense of orientation and reinforcement).

Filler particles or fibers include wood fibers (including groundwood, thermomechanical pulp (TMP) and bleached or unbleached kraft or sulfite pulps), vegetable fibers (including cellulose, lignin, cotton, hemp, jute, flax, ramie, sisal and bagasse), animal fibers (including proteinaceous strands such as silkworm silk, spider silk, sinew, catgut, wool, sea silk and hair such as cashmere wool, mohair and angora, fur such as sheepskin, rabbit, mink, fox, or beaver), other synthetic polymeric fibers (including rayon, modal, Lyocell polyamide nylon, PET or PBT polyester, phenol-formaldehyde (PF), polyvinyl alcohol fiber (PVA) vinylon, polyvinyl chloride fiber (PVC) vinyon, polyolefins (PP and PE) olefin fiber, acrylic polyesters, pure polyester, aromatic polyamids (aramids) such as Twaron, Kevlar and Nomex, polyethylene (PE), HMPE (e.g. Dyneema or Spectra), polyurethane fiber, and elastomers including spandex), metallic fibers such as those drawn from ductile metals such as copper, gold or silver and extruded or deposited from more brittle ones, such as nickel, aluminum or iron, stainless steel fibers, silicon carbide fibers, clay particles, carbon fibers or glass fibers.

Particularly important fibers include the so-called micro and nano fibers including nanocellulous fibers and synthetic nanotubules including carbon nanotubes, inorganic nanotubes and DNA nanotubes.

Fibers also includes microfibers known as sub-denier fibers (such as polyester drawn to 0.5 dn). Denier and Detex fibers include fibers categorized by weight and length measurements. Fiber designs also includes fibers split into multiple finer fibers. Most synthetic fibers are round in cross-section, but special designs can be hollow, oval, star-shaped or trilobal. The latter design provides more optically reflective properties. Synthetic fibers may also be crimped to provide a woven, non woven or knitted structure. Fiber surfaces can also be dull or bright. Dull surfaces reflect more light while bright tends to transmit light and make the fiber more transparent.

Very short and/or irregular fibers have been called fibrils. Natural cellulose, such as cotton or bleached kraft, show smaller fibrils jutting out and away from the main fiber structure.

Fibers alignment can also be tailored by the application of external forces such as magnetic fields.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the present disclosure, and together with the general description given above and the detailed description given below, serve to explain the principles of the present disclosure. As shown throughout the drawings, like reference numerals designate like or corresponding parts.

DETAILED DESCRIPTION OF THE EXEMPLARY EMBODIMENTS OF THE DISCLOSURE

Figure 1A:
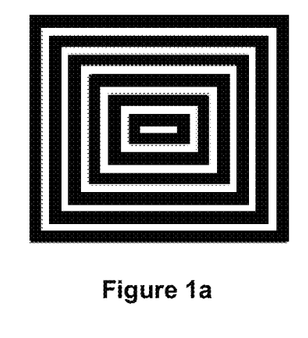
FIGS. 1a and 1b illustrate examples of tubular polygonal microlayer geometries incorporating aspects of the disclosed embodiments.
Figure 1B:
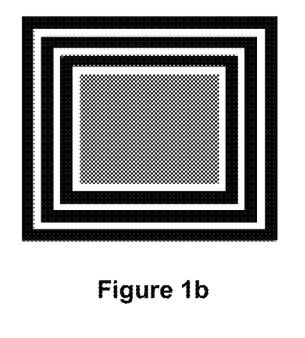
Figure 1C:
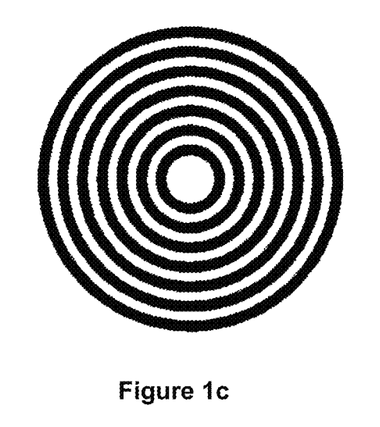
FIGS. 1c and 1d illustrate examples of tubular annular microlayer geometries in a product incorporating aspects of the disclosed embodiments.
Figure 1D:
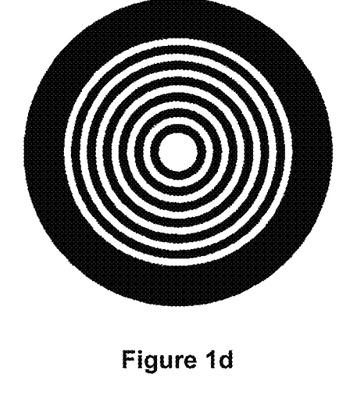
Figure 2:
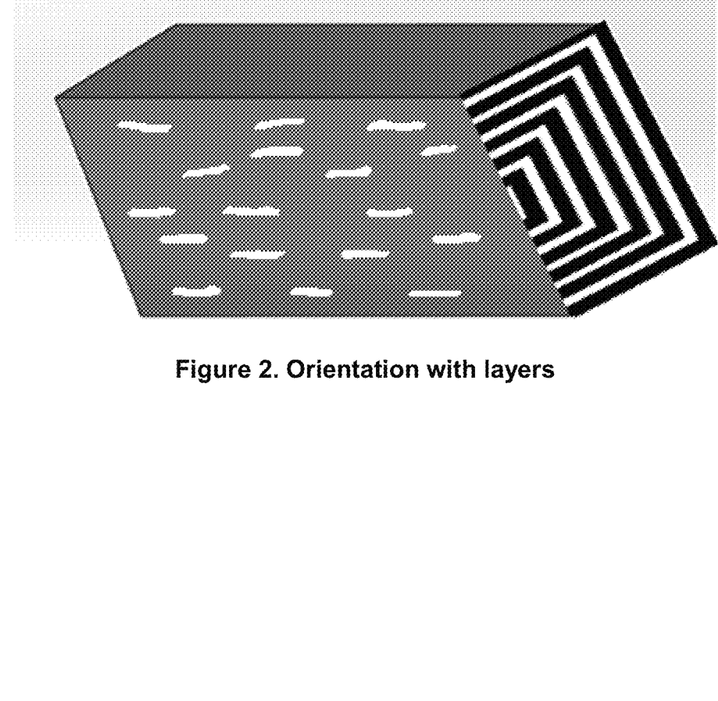
FIG. 2 illustrates the alignment of fibers along the extruded layers in a product incorporating aspects of the disclosed embodiments.

Rotating small, micro and nano-layer extrusion processes are described in U.S. Pat. No. 7,690,908. Small, micro and nano layer Non-rotating extrusion processes are described in U.S. Patent Publication 2012/0189789. U.S. patent application Ser. No. 14/084,601 filed Nov. 19, 2013, entitled "Method Of Creating Multilayered Products Through The Folding Of Continuous Layers," U.S. patent application Ser. No. 13/972,753 filed Aug. 21, 2013, entitled "Microlayer Coextrusion of Optical End Products, U.S. Patent Publication 2013/344,271, and U.S. Patent Publication 2014/034, 355 refer to other extrusion processes and methods. Each of the disclosures of the aforesaid patent, publication and application are herein incorporated by reference in their entirety. Altering the die plate orientation around the central extrusion axis allows for the preparation of new geometric extrusion products described in further detail herein. Polygonal and annular geometries are described above. Such geometries composed of milli, micro and nano layer extrusions can also include fillers and fibers. When these fillers or fibers are extruded in the small, milli, micro, or nano layers the fibers tend to align along extruded layers such as depicted in FIG. 2. The relative sizes of fillers to sizes of layers will affect the degree of orientation.

Although the embodiments disclosed herein will be described with reference to the drawings, it should be understood that the embodiments disclosed herein can be embodied in many alternate forms. In additional any suitable size, shape or type of elements or materials could be used.

Figure 3:
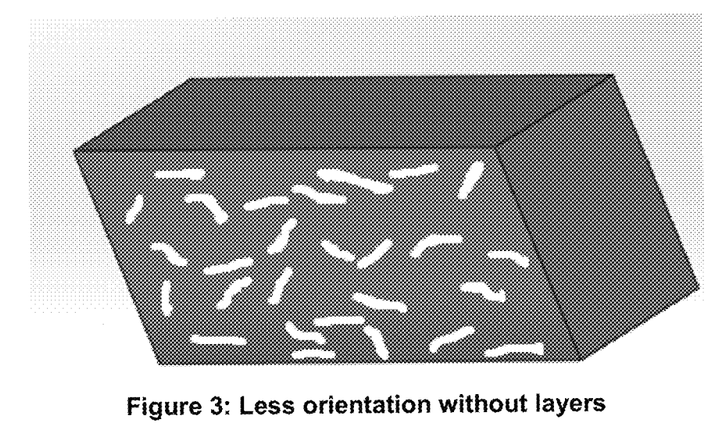
FIG. 3 illustrates an example of larger extrusion layers, no-layers or coated materials containing fibers have fiber orientations that are more random or less ordered in a product incorporating aspects of the disclosed embodiments.

Larger extrusion layers, no-layers or coated materials containing fibers have fiber orientations that are more random or less ordered, such as depicted in FIG. 3.

Orientation of fibers creates anisotropic mechanical properties in the product. This is important in the creation of composite materials. Extrusion in general has an orienting effect on fibers, however the inclusion of microlayers will amplify the degree of orientation. If the fiber has stronger mechanical properties than the matrix polymer, the product will be stronger in the direction of the fibers. The layering of materials has the benefit of resisting crack propagation from one layer through the next.

EXAMPLE PRODUCT GEOMETRIES

Example 1

Fully Oriented Composite Beam

Figure 4:
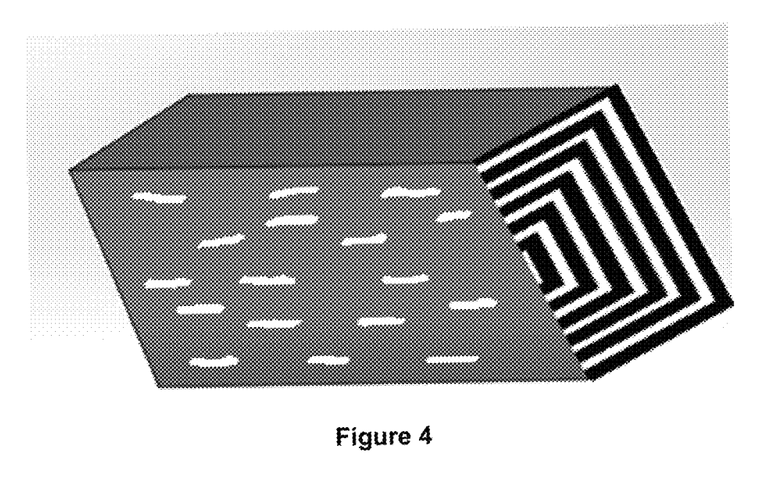
FIG. 4 illustrates a fully oriented composite beam in a product incorporating aspects of the disclosed embodiments.

A fully oriented composite beam, FIG. 4, may be prepared by coextrusion of two or more compositions made up of solely small, milli, micro, or nano layers to ensure complete orientation of the fiber particles. This beam may have enhanced strength in the direction of extrusion and be more resistant to bending perpendicular to the fiber orientation.

Example 2

Hollow Beam

Figure 5:
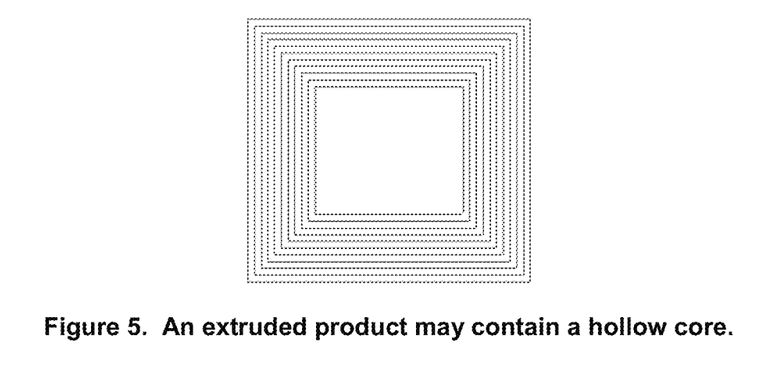
FIG. 5 illustrates a hollow core in a hollow end product incorporating aspects of the disclosed embodiments.

A hollow composite beam, FIG. 5, may be prepared by coextrusion of the same base composition wherein the compositions contain different excipients. These beams may be made up of solely small, milli, micro, or nano layers.

Example 3

Beam Core with Oriented Outer Layers

Figure 6:
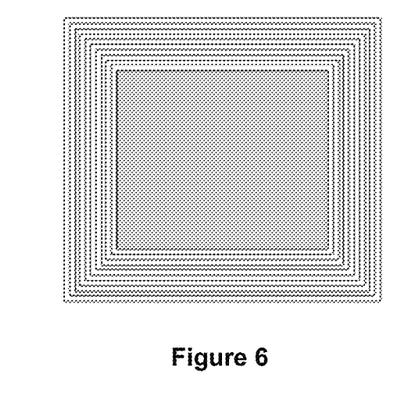
FIG. 6 illustrates a composite inner core extruded with composite small, micro or nano layers on the exterior in a product incorporating aspects of the disclosed embodiments.

Another product entails a composite inner core extruded with composite small, micro or nano layers on the exterior (see FIG. 6). In this product, the layers may have axially oriented fibers or particles while fibers in the center core would remain less oriented. This product would have outer layers for enhanced anisotropic strength similar to the product above while the inner core would provide more strength in other directions. The location of the oriented fibers on the outside of the product is particularly important for enhanced bending resistance. The core in this product could also be foamed in order to reduce weight.

Example 4

Multiple Levels of Layers

Figure 7:
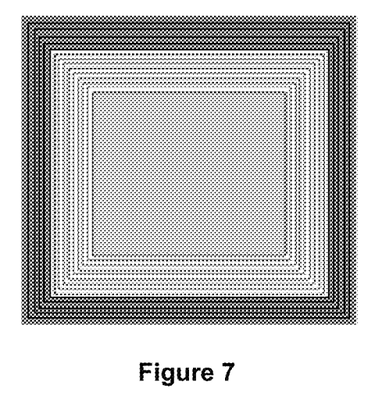
FIG. 7 illustrates multiple levels of layers containing different compositions in a product incorporating aspects of the disclosed embodiments.

Multiple levels of layers containing different compositions can be extruded (see FIG. 7). Layers can be of variable size and composition with different fillers or fibers and with or without a core. Such layering allows for isolation or insulation of conducting layers or optical zones.

Example 5

I-Beam

Figure 8A:
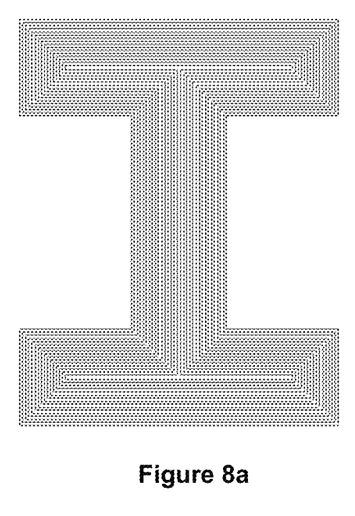
FIGS. 8a and 8b illustrate exemplary I beam profile configurations in a product incorporating aspects of the disclosed embodiments.
Figure 8B:
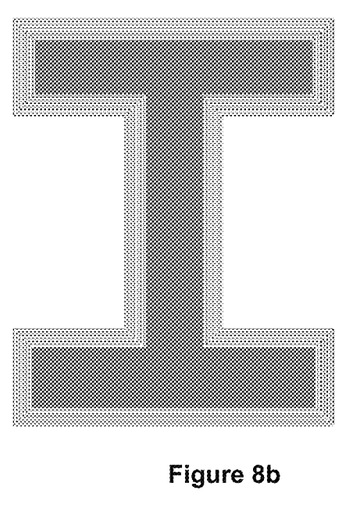

The extrusion methods described herein yield various profile configurations, including cylindrical, I-beam (see FIGS. 8a and b), C-channel, L-shaped, rectangular, square, hollow cylinder. Each of these extrusions may have differential inclusion of fillers and fibers as well as the presence or absence of core material.

Fiber Composites

Fibers such as carbon fiber, glass fiber, Kevlar, etc. have been used in conjunction with polymers to form composite materials. These composites can be made with long continuous fibers where a polymer matrix is applied onto the fibers or they can be made with shorter fibers that are mixed with polymer and formed into a desired shape. These composite materials have desirable mechanical properties while maintaining a low density. The ability to orient fibers allows for the mechanical properties to be enhanced in a desired direction where the load will be greatest which allows for less material to be used to obtain a desired strength. These materials are found in in a wide range of products such as cars, jets, wind turbines and sporting goods.

Through microlayer coextrusion, discontinuous fiber composites can be formed with oriented fibers in the direction of the extrusion. With enhanced mechanical properties in this direction, the products will provide a strong tensile strength as well as a strong resistance to bending with load perpendicular to the oriented direction. The example geometries in FIGS. 1 through 3 and 4 through 8 would all be applicable to these composites. The cores in FIGS. 1b, 6, 7 and 8b could also be some kind of lightweight structure such as honeycomb in order to reduce weight. As mentioned above the core may also contain a less oriented filler/fiber composite to enhance strength in other directions. Hollow geometries such as in FIG. 5 could be used as casings for internal components of a product after the extrusion process. Such a case could also be made with multiple levels of layers such as in FIG. 7. The other level of layers could have microlayered polymer containing metallic flakes or particles which would align to enhance conductivity and provide EMI shielding.

Wood Plastic Composites

Wood plastic composites have been used as a replacement for preservative treated and other more expensive woods. Wood filler plastic composites are advantageous because they are durable, require low maintenance, will not warp, splinter, or crack, and can be manufactured to be resistant to UV light. The plastic makes the composites very workable and can be produced to meet almost any designed shape. Wood plastic composites are also considered a sustainable material because they can be made using recycled plastic and the waste products from the wood industry. The higher density allows the wood plastic composites to better hold screws, but also makes the final product heavier. For this reason many wood plastic composites are designed with a hollow cross section.

Properties of the composite can be controlled though polymer type, wood fiber size and type, additives such as processing aids or property enhancers, and also wood fiber orientation. Polymers typically used include low and high density polyethylene, polypropylene, and polyvinyl chloride. These polymers are suitable as their melting temperature is below the thermal decomposition temperature of the wood fibers. Some property enhancers that are commonly used include biocides, inorganic fillers, fire retardants, ultraviolet stabilizers, and colorants.

Fiber orientation plays a strong role in determining the properties of an extruded wood plastic composite. The nanolayer extrusion would create strong fiber orientation within each individual layer. This would result in unique and anistropic wood plastic composite properties. These wood plastic composites would have increased strength and tensile modulus along with more desirable coefficient of thermal expansion and modulus of elasticity.

In one embodiment of an extruded layered wood plastic composite the layers of wood/plastic mixture would comprise the entire structure of a hollow profile (FIG. 5). This structure would have very strong anisotropic properties. The orientation of the fibers would decrease crack propagation perpendicular to the direction of extrusion. The hollow structure also serves to lower the overall weight and increase the insulation properties of the product.

In another embodiment (FIG. 6) the product would contain outer layers (e.g. skin) of wood plastic composite with an inner unlayered core. This embodiment combines the strongly anisotropic properties of the layered wood composite with the unoriented properties of the core. This core could also be produced through foaming. Foaming the inner layer would lower the density of the final product and also increase insulation properties. This layering method may be used to add desired mechanical properties to the product through judicious choice of the orientation of these layers.

Multilayered Clay Product

Nanoscale particles of clay dispersed within a polymer matrix have been shown to improve mechanical, fire, and barrier properties. Clay nanoparticles provide an environmentally friendly alternative to additives typically used to improve polymer properties.

The improvement in material properties is largely dependent on the orientation and degree of dispersion of the clay nano-particles. Dispersion of clay nano-composites is difficult due to the hydrophilic nature of the clay platelets in contrast to the hydrophobic nature of the polymer.

The use of clay nanoparticles to provide fire resistance has arisen as a more environmentally friendly alternative to the halogen-based fire retardants commonly used today. Currently fire retardation using clay nanoparticles typically involves layer by layer deposition of clay and polymer matrices. This process is time consuming and typically involves the use of harmful solvents. Using melt processing would provide many advantages over clay/polymer deposition using solvents: it is a process that is widely used and understood in industry. Melt processing is more environmentally friendly, and there is a greater flexibility in the available plastics that can be used because there is no requirement to be solvent compatable. Fire retardation using clay nanocomposites stongly depends on the dispersion of the clay particles. More uniform clay dispersion allows the clay plates to entangle more easily when exposed to heat. The entangled clay particles work to provide improved flame resistance through the formation of char and the prevention of dripping.

Figure 9:
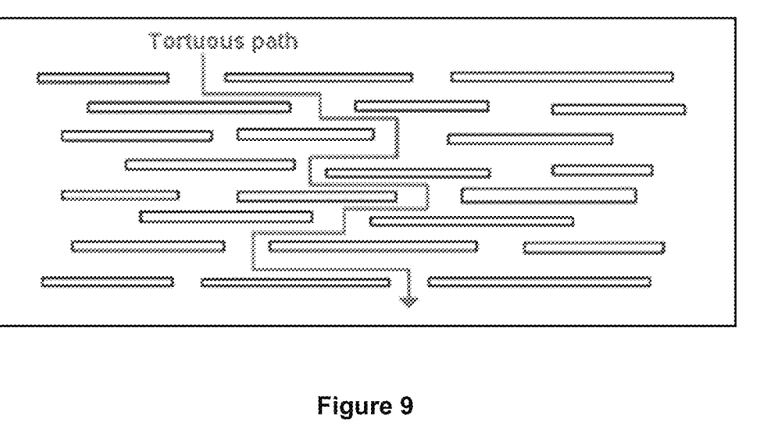
FIG. 9 illustrate an exemplary alignment of particles to create a tortuous path in a product incorporating aspects of the disclosed embodiments.

The large aspect ratio of clay particles can be used to increase barrier properties. The alignment of particles creates a tortuous path (see FIG. 9) for any permeates to travel. This path decreases the permeability of polymer clay nanocomposite.

The degree of dispersion of nano-sized clay particles determines the mechanical, fire, and barrier properties of the polymer composite. Even dispersion of these particles is often difficult to achieve due to the materials tendency to form agglomerates in the polymer matrix. Various methods have been used to increase the dispersion of nano-particles within a polymer matrix including reactive extrusion where the reaction between the nanoparticle and polymer leads to more dispersion or the use of solvents designed to break apart the agglomerates. Extrusion of a masterbatch with predispersed nano particles can also lead to a decrease of dispersion as the particles recombine during the extrusion process. With the microlayer extrusion process the formation of agglomerates would be hindered due to the encapsulation of nano-material within each layer. Agglomerates will be less likely to form across the layer boundaries of the microlayer extrusion process. The increased dispersion would lead to more desirable and uniform mechanical, flame, and barrier properties.

In another embodiment of the product, the outer layers of the product would contain layers of nano-sized clay composites on the outer surface of a product (FIG. 6). These layers would be used to increase fire protection and barrier properties of the product.

Another embodiment of the product could provide added barrier and fire resistance properties to an anisotropic product (FIG. 7). The outer layers (e.g. skin) could contain the nano-clay composite while the inner layers and core contain a different material, such as nanocellulose or wood plastic composite. In this embodiment the clay composite and the inner layers and core could be coextruded together or the clay layers could be added separately.

Nanocellulose Polymer Composite

Nanocellulose fibers are high aspect ratio fibers that may be used to form a composite material. This fibers can be isolated from any cellulose source, typically wood pulp. Nanocellulose fibers could provide an organic polymer composite that has tensile strength and stiffness properties that exceed those of typical polymer reinforcements, such as glass fibers. Along with improved mechanical properties, the nanocellulose composites also demonstrate decreased permeability to gases and water, improved thermal stability, and a greater heat distortion temperature.

Nanocellulose can be processed through a solvent or melt approach with a polymer matrix to produce a nanocomposite. The solvent approach allows the dispersion of the nanocellulose to be tightly controlled, but only certain polymers can be used in the approach. A melt processing technique is a green process that is industrially and economically viable. The hydrophilicity of the nanocellulose makes an even dispersion difficult to obtain using melt processing. Techniques such as surface grafting of polymer compatable materials onto the nanocellulose has shown some promise of improving disepersion, but the high shear rates found in typical extrusion processes often decrease the chances of the grafted particle remaining attached to the nanocellulose.

Depending on the technique used to isolate the nanocellulose fibers, the temperature stability of the fibers can become an issue during melt processing. One method that may be used to increase both the temperature stability and the dispersion of the nanocellulose is to prepare the nancellulose with high molecular weight polyethylene oxide (PEO). This mixture can then be combined and extruded with typical melt processable polymers.

In another embodiment the exemplary product would contain layers of nanocellulose composite throughout the entirety of the product. The nanocellulose could be compounded with suitable polymers and/or grafted to a compatible polymer. This layering technology allows for the confinement of nanocellulose which increase beneficial nanocellulose to nanocellulose interaction.

In another embodiment the nanocellulose layers could be extruded over a solid core (FIG. 6) through coextrusion or extrusion coating. This product would be particularly suited for enhanced barrier properties provided by the outer nanocellulose layers, but would still maintain the mechanical properties of the inner core.

Nanocellulose is a 'green' or environmentally friendly alternative to many other fibers or fillers and has the potential to become widely available. PLA (Polylactic acid) is a biodegradable polymer with which there has been some success in creating relatively dispersed nanocellulose composites. PLA is also widely used as a filament for 3D printing. A microlayered nanocellulose/PLA composite filament in which some or all layers contain nanocellulose fibers could drastically improve properties while remaining a green alternative to other plastics.

Thus, while there have been shown, described and pointed out, fundamental novel features of the invention as applied to the exemplary embodiments thereof, it will be understood that various omissions and substitutions and changes in the form and details of devices and methods illustrated, and in their operation, may be made by those skilled in the art without departing from the spirit of the invention. Moreover, it is expressly intended that all combinations of those elements and/or method steps, which perform substantially the same function in substantially the same way to achieve the same results, are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for creating multilayered products comprising merging multiple streams to form contiguous layers without weld lines of a tubular or annular microlayered composite, wherein one or more layers of said tubular microlayered composite contain fibers or particles.

2. A method according to claim 1, wherein said tubular microlayered composite contains fibers.

3. A method according to claim 1, wherein said tubular microlayered composite contains wood fibers or particles.

4. A method according to claim 1, wherein said tubular microlayered composite contains clay particles.

5. A method according to claim 1, wherein said tubular microlayered composite contains nanocellulose fibers or particles.

* * * * *